United States Patent
Ohtani et al.

(10) Patent No.: US 7,113,644 B2
(45) Date of Patent: Sep. 26, 2006

(54) IMAGE CODING APPARATUS AND IMAGE CODING METHOD

(75) Inventors: Akihiko Ohtani, Mino (JP); Yasushi Tanaka, Kadoma (JP); Akihiro Watabe, Kashiba (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 783 days.

(21) Appl. No.: 10/365,695

(22) Filed: Feb. 13, 2003

(65) Prior Publication Data

US 2003/0152279 A1    Aug. 14, 2003

(30) Foreign Application Priority Data

Feb. 13, 2002    (JP) ............................. 2002-035697

(51) Int. Cl.
*G06K 9/36*    (2006.01)
(52) U.S. Cl. ...................... 382/236; 382/232; 382/238
(58) Field of Classification Search ................ 382/236, 382/238, 232, 233, 107, 209; 348/699, 700; 375/240.16, 240.02, 240.24, 240.26, 240.27
See application file for complete search history.

(56) References Cited

U.S. PATENT DOCUMENTS 6,370,270 B1 * 4/2002 Nair et al. .................. 382/209
6,380,986 B1 * 4/2002 Minami et al. ............. 348/699
6,834,080 B1 * 12/2004 Furukawa et al. ..... 375/240.02

FOREIGN PATENT DOCUMENTS

JP    8-262947    10/1996
JP    2888288    2/1999

OTHER PUBLICATIONS

Masayuki Mizuno et al., "A 1.5-W Single-Chip MPEG-2 MP@ML Video Encoder with Low Power Motion Estimation and Clocking", 1997, pp. 1807-1816.

* cited by examiner

*Primary Examiner*—Anh Hong Do
(74) *Attorney, Agent, or Firm*—Steptoe & Johnson LLP

(57) ABSTRACT

An image coding apparatus includes a coding unit 100 for generating a code A, a coding unit 110 for generating a code B, an image reproduction unit 200, an image reproduction memory 204, and a motion vector detection unit 300. The motion vector detection unit 300 detects a motion vector using an image in the image reproduction memory 204, whereby the coding unit 100 generates the code A, while the image reproduction unit 200 reconstructs an image on the basis of output from the coding unit 100 and stores the image in the image reproduction memory 204. In the operation for generating the code B, the coding unit 110 is employed as a coding unit for generating the code B, while commonly employing the image reproduction memory 204, the motion vector detection unit 300, and the image reproduction unit 200 as employed in the generation operation for code A.

13 Claims, 9 Drawing Sheets

IMAGE CODING APPARATUS AND IMAGE CODING METHOD

FIELD OF THE INVENTION

The present invention relates to an image coding apparatus and image coding method using motion compensation inter-frame prediction and, more particularly, to an image coding apparatus that outputs plural coded data on the basis of one image input.

BACKGROUND OF THE INVENTION

To implement the motion compensation inter-frame prediction, a method is utilized in which information indicating from which position in the preceding image a part of the present image has moved (i.e., a motion vector) is employed to reduce temporal redundancy. A block matching method is one of the methods for extracting the motion vector.

FIG. 10 is a diagram showing the principle of the block matching method.

As shown in FIG. 10, a coding frame image (target to be coded) and a search range frame image for detecting a motion vector are compared with each other to extract, from a search range 904 in a search range frame 903, a block (best matching block) 902 having the closest evaluation value (i.e. having the highest correlation) with respect to a target block to be coded (hereinafter, referred to as a coding target block) 906 in a frame to be coded (hereinafter, referred to as a coding frame) 905, thereby to detect a motion vector 901.

A motion vector detection circuit is an important circuit block that decides whether the coding efficiency is improved, i.e., whether a higher image quality is obtained from a smaller amount of codes. Thus, it is preferable that this circuit can widen the search range 904 and detect the motion vector 901 indicating a block that is closer to the coding target block 906, thereby to obtain a higher image quality. However, when the search range 904 is widened, problems occur that the scale of the motion vector detection circuit or the processing time is increased, and further the bus width is increased to supply a larger search range to the motion vector detection circuit.

Some conventional image coding apparatuses internally contain all coding circuits including a motion search unit for performing motion vector detection, to reduce the number of components.

For example, Japanese Published Patent Application No. Hei.10-108199 shows, in FIG. 1, an apparatus that implements inter-frame image predictive coding and, more particularly, an apparatus that outputs one kind of coded data from one image input. According to this apparatus, an image signal is inputted to an image input unit, and a motion search unit performs motion search, whereby a motion vector is finally obtained. A pixel value calculation unit subjects prediction error data to processing of DCT, quantization, inverse quantization, and inverse DCT processes. A variable length coding unit executes a variable length coding process, and a code output unit outputs a final code string. A frame memory, a frame memory control unit, control processors and a host interface are needed at that time, while when the host interface controls the image input unit, the motion search unit, the pixel value calculation unit and the variable length coding unit in time division, the control processors for the entire processing sections, such as the image input unit, the motion search unit, the pixel value calculation unit and the like can be consolidated.

More specifically, as shown in FIG. 5 of Japanese Published Patent Application No. Hei.10-108199, the frame control unit internally includes a frame memory index register, and then the control processor sets information in the frame memory index register for memory area dedication, thereby enabling to change a writing area in the frame memory for the image data that is inputted from the image input unit, or a writing area in the frame memory for a prediction image that is obtained by the pixel value calculation unit. It is specified in this application that this construction provides an image coding apparatus including fewer components, in which, for example, one external memory is provided.

The bandwidth that is required for transferring data corresponding to a coding target in a common image according to NTSC (720 pixels×480 lines×30 frames/sec) is given by Formula (1). The bandwidth that is required for transferring data corresponding to a search range in a case where the search range consists of 48 pixels×48 lines (±16 pixels in the horizontal direction, and ±16 lines in the vertical direction) is given by Formula (2).

$$((720 \text{ pixels} \times 480 \text{ lines} + 360 \text{ pixels} \times 240 \text{ lines} \times 2) \times 30 \text{ frames/sec} \times 8 \text{ bit/pixel}) \times 2 = 0.25 \text{ Gps} \quad \text{Formula (1)}$$

$$((720 \text{ pixels} \times 480 \text{ lines} + 360 \text{ pixels} \times 240 \text{ lines} \times 2) \times 30 \text{ frames/sec} \times 8 \text{ bit/pixel}) + ((720 \text{ pixels} \times 480 \text{ lines}) \times (48 \text{ pixels} \times 48 \text{ lines})/(16 \text{ pixels} \times 16 \text{ lines}) \times 30 \text{ frames/sec} \times 8 \text{ bit/pixel}) \times 2 + ((360 \text{ pixels} \times 240 \text{ lines} \times 2) \times 30 \text{ frames/sec} \times 8 \text{ bit/pixel}) \times 2 = 1.7 \text{ Gps} \quad \text{Formula (2)}$$

The multiplier "2" at the end of Formula (1) represents writing and reading into/from the external memory.

The first term of Formula (2) represents writing of an prediction image (0.12 Gps), the second term represents reading of the search range (prediction image ) (only luminance components) (1.5 Gps), and the third term represents reading of color-difference components of the prediction image (0.08 Gps). The multipliers "2" in the second and third terms of Formula (2) result from bidirectional inter-frame prediction.

In the prior art, all of these processing are implemented by the transfer of data with an external memory that is connected via one data bus.

For example, as described in IEEE JOURNAL OF SOLID-STATE CIRCUITS, VOL. 32, NO. 11, NOVEMBER 1997, when 32 bit-width data is transferred in an 81 MHx operation, the data transfer is performed at a bandwidth of 2.6 Gps, and thus there is a margin that is approximately 1.5 times larger than the necessary data transfer amount (i.e., 1.7 Gps). Considering that codes in the output stage are once buffered by the external memory, and in view of the overhead for data transfer and LSI costs greatly depending on the number of pins, the above transfer rate and data width are practical at the present stage.

In order to output one kind of coded data from one image input, the conventional image coding apparatus stores plural frame data, such as the prediction image or search image, in one external memory, and carries out the image coding by data transfer with the external memory.

However, according to the conventional image coding apparatus, when the quantity of processing is increased like in a case where two kinds of coded data are outputted from one image input, the bandwidth of the data transfer between the external memory and the coding unit is increased about twice, and thus high-speed transfer or high parallel input is required to construct the image coding apparatus, resulting in an increased system cost. Especially, Formulas (1) and (2)

show that the data transfer amount associated with the search range that is employed in the motion vector detection is larger than other data transfer amounts by an order of magnitude.

Further, the motion vector detection circuit that is required for image compressive coding that utilizes the motion compensation inter-frame prediction has a circuit scale that is normally about 10 times greater than those of other circuits that perform processing such as orthogonal transformation (DCT) or variable-length coding, and further the quantity of processing is about 100 times larger. When two of the motion vector detection circuits are provided in the case where two kinds of coded data are to be generated, the circuit scale is increased, and thus the processing time gets longer when this processing is carried out by the same circuit source or program.

SUMMARY OF THE INVENTION

The present invention has for its object to provide an image coding apparatus that transfers an equivalent amount of data to/from a memory also when plural coded data are outputted from one image input, and can be obtained at a lower system cost with little increase in the circuit scale or processing time.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided an image coding apparatus that outputs plural codes for one coding target image, utilizing motion compensation inter-frame prediction including: a motion vector detection unit for dividing the coding target image into predetermined blocks and extracting a block in a search image, having a highest correlation with each of the predetermined blocks, thereby to detect a first motion vector for each of the predetermined blocks; N (N is an integer equal to two or larger than two) pieces of coding units for coding the first motion vector as well as performing motion compensation inter-frame prediction using an image in a position indicated by the first motion vector in the search image and the coding target image, in accordance with coding parameters which are given from outside, thereby to generate coded data; an image reproduction unit for reconstructing an image using coded data which is outputted from one of the coding units; and an image reproduction memory for storing the image reconstructed by the image reproduction unit, as a search image to be supplied to the motion vector detection unit, and the N pieces of coding units encode the coding target image in accordance with the coding parameters which are given to the respective coding units, and output the respective coded data. Therefore, in the image coding apparatus that generates plural kinds of coded data, the coding units can share the image reproduction unit, the image reproduction memory, and the motion vector detection unit, to reduce the circuit scale. Further, this image coding apparatus requires only one set of processes by the motion vector detection unit and the image reproduction unit, so that the processing time can be reduced. In addition, the image reproduction unit reconstructs an image using coded data which is outputted from one of the coding units, whereby the amount of data transferred from the image reproduction unit to the image reproduction memory in the case of generating plural kinds of coded data can be made equivalent to the amount of transferred data in the case of generating one kind of coded data, and accordingly an image coding apparatus having a lower system cost is realized without increasing the circuit scale, the number of data pins, and the processing time.

According to a 2nd aspect of the present invention, there is provided an image coding apparatus that outputs plural codes for one coding target image, utilizing motion compensation inter-frame prediction including: a motion vector detection unit for dividing the coding target image into predetermined blocks and extracting a block in a search image, having a highest correlation with each of the predetermined blocks, thereby to detect a first motion vector for each of the predetermined blocks; a first memory for storing the coding target image; a coding unit for coding the first motion vector as well as performing motion compensation inter-frame prediction using an image in a position indicated by the first motion vector in the search image and the coding target image, in accordance with plural coding parameters which are supplied from outside to the one coding target image, thereby successively generating coded data corresponding to each of the plural coding parameters; an image reproduction unit for reconstructing an image employing one of the coded data which are generated by the coding unit; and a second memory for storing the image reconstructed by the image reproduction unit as a search image that is supplied to the motion vector detection unit. Therefore, plural kinds of coded data can be generated without providing plural coding units corresponding to the plural coding parameters, respectively, so that the entire circuit scale of the image coding apparatus can be reduced. Further, the image reproduction unit reconstructs an image employing one of the coded data which are generated by the coding unit, whereby also in the case of outputting plural kinds of coded data with respect to one image input, the amount of data transferred from the image reproduction unit to the image reproduction memory can be made equivalent to that in the case of generating one coded data, and accordingly an image coding apparatus having a lower system cost can be provided without increasing the circuit scale, the number of data pins, or the processing time.

According to a 3rd aspect of the present invention, there is provided an image coding method for outputting plural codes for one coding target image, utilizing motion compensation inter-frame prediction including: a motion vector detection step of dividing the coding target image into predetermined blocks and extracting a block in a search image, having a highest correlation with each of the predetermined blocks, thereby to detect a first motion vector for each of the predetermined blocks; a first coding step of coding the first motion vector as well as performing motion compensation inter-frame prediction using an image in a position indicated by the first motion vector in the search image and the coding target image, in accordance with a coding parameter that is given from outside, thereby to generate coded data; an image reproduction step of reconstructing an image using the coded data that is generated in the first coding step; a reproduced image storage step of storing the image reconstructed in the image reproduction step, as a search image to be employed in the motion vector detection step; and a second coding step of coding the first motion vector as well as performing motion compensation inter-frame prediction using the image in the position indicated by the first motion vector in the search image and the coding target image, in accordance with the coding parameter given from the outside, thereby to generate coded data, and then the first coding step and said second coding step are carried out in parallel. Therefore, also when plural kinds of coded data are to be generated, the motion vector detection process in the motion vector detection step and the image reconstruction process in the image reproduction step are carried out in one process, so that the processing time can be reduced. Further, the image reconstruction in the image reproduction step is performed using the coded data that is generated in the first coding step, whereby also in the case of generating plural kinds of coded data, the amount of transferred data corresponding to the image reconstructed in the image reproduction step can be made equivalent to that in the case of outputting one kind of coded data, and accordingly an image coding method having a lower operation cost is provided without increasing the processing time.

According to a 4th aspect of the present invention, there is provided an image coding method for outputting plural codes for one coding target image, utilizing motion compensation inter-frame prediction including: a coding target image storage step of storing the coding target image; a motion vector detection step of dividing the coding target image into predetermined blocks and extracting a block in a search image, having a highest correlation with each of the predetermined blocks, thereby to detect a first motion vector for each of the predetermined blocks; a coding step of coding the first motion vector as well as performing motion compensation inter-frame prediction using an image in a position indicated by the first motion vector in the search image and the coding target image, in accordance with plural coding parameters supplied from outside for the one coding target image, thereby successively generating coded data corresponding to each of the plural coding parameters; an image reproduction step of reconstructing an image using one coded data that is generated in the coding step; and a search image storage step of storing the image reconstructed in the image reproduction step as a search image that is used in the motion vector detection step. Therefore, also when plural kinds of coded data are to be generated, the motion vector detection in the motion vector detection step and the image reconstruction in the image reproduction step can be performed in one process, so that the processing time can be reduced. Further, the image reconstruction in the image reproduction step is performed using one coded data that is generated in the coding step, whereby also in the case of generating plural kinds of coded data, the amount of transferred data corresponding to the image that is reconstructed in the image reproduction step can be made equivalent to that in the case of outputting one coded data, and accordingly an image coding method having a lower operation cost can be provided without increasing the processing time.

DETAILED DESCRIPTION OF THE PREFERRED EMBODIMENTS

Hereinafter, embodiments of the present invention will be described with reference to FIGS. 1 to 9.

EMBODIMENT 1

Figure 1:
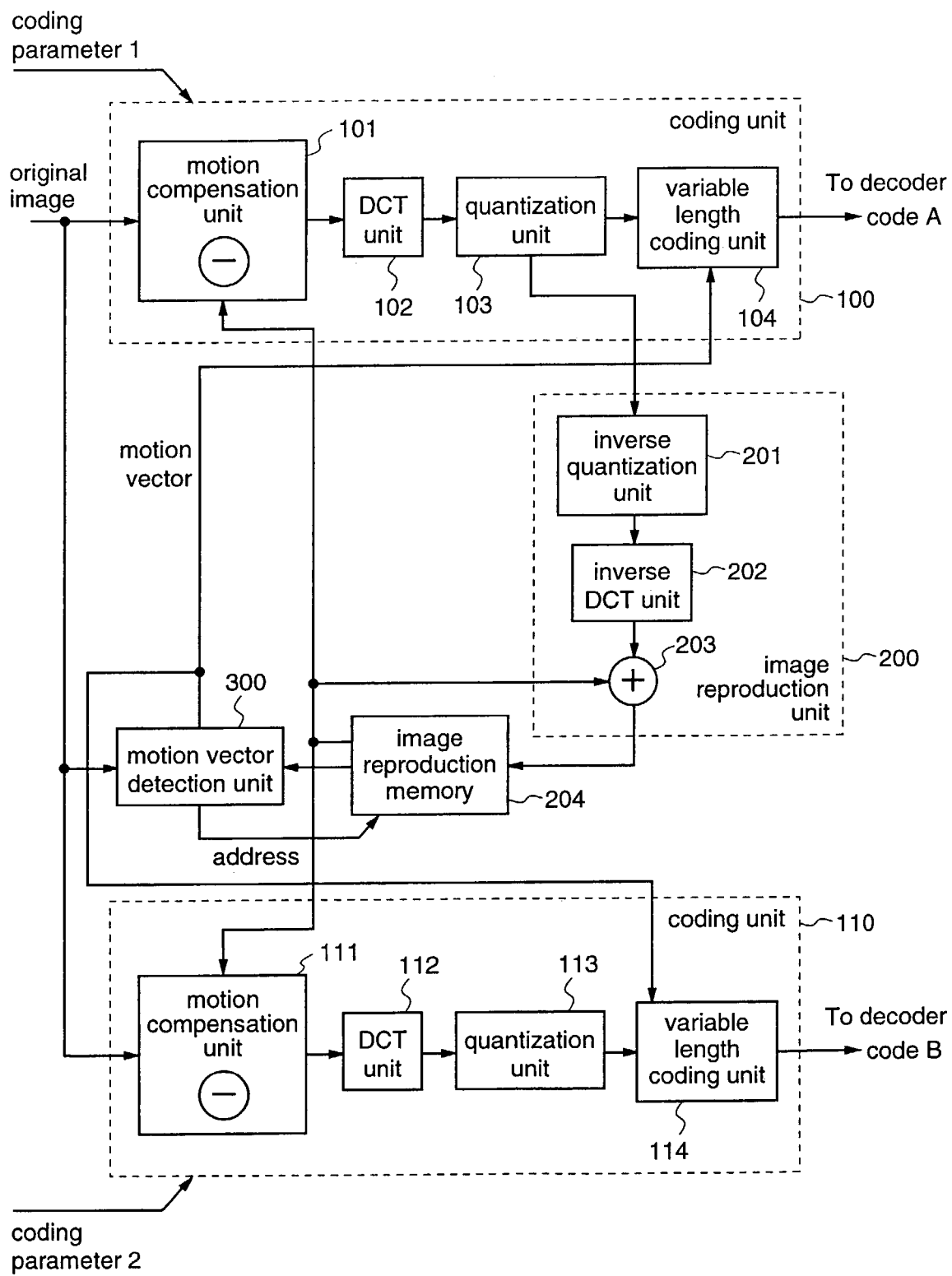
FIG. 1 is a diagram for explaining a structure of an image coding apparatus according to a first embodiment of the present invention.

FIG. 1 is a diagram for explaining a structure of an image coding apparatus according to a first embodiment of the present invention.

In FIG. 1, reference numerals 100 and 110 denote a coding unit that controls the amount of codes in accordance with a coding parameter and encodes images, respectively. Numeral 200 denotes an image reproduction unit that reconstructs an image by employing coded data that is generated by the coding unit 100. Numeral 300 denotes a motion vector detection unit that divides an original image (coding target image) into predetermined blocks as processing units, in each of which the coding process is to be carried out, and extracting a block in a search image that is inputted from an image reproduction memory 204, having the highest correlation with each of the predetermined blocks, thereby detecting a motion vector (first motion vector).

Numerals 101 and 111 denote a motion compensation unit that performs motion compensation on the basis of the motion vector (first motion vector) that is calculated by the motion vector detection unit 300, respectively. Numerals 102 and 112 denote a DCT unit, numerals 103 and 113 denote a quantization unit, and numeral 104 and 114 denote a variable length coding unit, respectively. The coding units 100 and 110 are constituted by the motion compensation units 101 are 111, the DCT units 102 are 112, the quantization units 103 and 113, and the variable length coding units 104 and 114, respectively. The coding units 100 and 110 each encode the motion vector in accordance with the coding parameter that is supplied form the outside, as well as perform motion compensation inter-frame prediction using an image in a position indicated by the motion vector in the search image, and the coding target image that is inputted from the outside, thereby to generate coded data.

Numeral 201 denotes an inverse quantization unit, numeral 202 denotes an inverse DCT (IDCT) unit, numeral 203 denotes an addition unit that adds an output from the inverse DCT unit 202 and image data before motion compensation to perform image reconstruction, and numeral 204 denotes an image reproduction memory that stores a reconstructed image.

Next, the operation of the image coding apparatus will be described.

Initially, the operations of the coding unit 100, the image reproduction unit 200, and the motion vector detection unit 300 are described. It is assumed here that the amount of already-generated codes A is supplied to the coding unit 100 as a coding parameter 1.

The motion vector detection unit 300 detects a motion vector on the basis of an evaluation value that is obtained by comparing the original image that is inputted from the outside and the search image that is supplied from the image reproduction memory 204 with each other, and supplies the detected motion vector to the image reproduction memory 204 and the variable length coding unit 104.

The image reproduction memory 204 reads an image in a position indicated by the motion vector (address in the image reproduction memory 204), and supplies the image to the motion compensation unit 101.

The motion compensation unit 101 performs motion compensation on the basis of the output from the image reproduction memory 204 and the original image that is inputted from the outside, and then the obtained data is passed through the DCT unit 102, the quantization unit 103 and the variable length coding unit 104, thereby to output a code A. The variable length coding unit 104 encodes also the motion vector obtained from the motion vector detection unit 300 when generating the code A.

The coding unit 100 that is constituted by the motion compensation unit 101, the DCT unit 102, the quantization unit 103 and the variable length coding unit 104 controls the amount of codes A to be generated, in accordance with the coding parameter 1 inputted from the outside, which is the information associated with the coding. Here, since the amount of already-generated codes A is supplied as the coding parameter 1, the coding unit 100 controls the amount of coded data, on the basis of the amount of already-generated codes A.

Then, the image reproduction unit 200 reconstructs an image using the data coded by the coding unit 100, and stores the reconstructed image in the image reproduction memory 204. As shown in the figure, the image is reconstructed by the image reproduction unit 200 on the basis of the output from the quantization unit 103 of the coding unit 100. For example, in cases where the data to be processed is data conforming to MPEG standards, the image is reconstructed by the image reproduction unit 200 on the basis of the output from the coding unit 100, to employ the reconstructed image as a search range frame image when I pictures (intra-frame coding images) and P pictures (inter-frame forward prediction coding images) according to MPEG are to be processed, for coding the subsequent P pictures or B picture (bidirectional prediction coding images).

Next, the operations of the coding unit 110, the image reproduction unit 200, and the motion vector detection unit 300 are described. It is assumed here that the amount of already-generated codes B is supplied to the coding unit 110 as a coding parameter 2.

The motion vector detection unit 300 detects a motion vector on the basis of the original image that is inputted from the outside and the search image that is supplied from the image reproduction memory, and supplies the detected motion vector to the image reproduction memory 204 and the variable length coding unit 114.

The image reproduction memory 204 reads an image in a position indicated by the motion vector (address in the image reproduction memory 204), and supplies the image to the motion compensation unit 111.

The motion compensation unit 111 performs motion compensation on the basis of the output from the image reproduction memory 204 and the original image that is inputted from the outside, and then the obtained data is passed through the DCT unit 112, the quantization unit 113, and the variable length coding unit 114, thereby to output a code B. The variable length coding unit 114 encodes also the motion vector obtained by the motion vector detection unit 300 when generating the code B.

The coding unit 110 that is constituted by the motion compensation unit 111, the DCT unit 112, the quantization unit 113, and the variable length coding unit 114 controls the amount of codes B to be generated, in accordance with the coding parameter 2 inputted from the outside, which is the information associated with the coding. Here, since the amount of already-generated codes B is supplied as the coding parameter 2, the coding unit 110 controls the amount of coded data according to the amount of already-generated codes B.

The present invention is characterized in that the image reconstruction associated with the coding unit 110 is not performed after the data is coded by the coding unit 110. According to the image coding apparatus of the first embodiment, in the operation for generating the code A, the motion vector detection unit 300 detects a motion vector by employing the image in the image reproduction memory 204, whereby the coding unit 100 generates coded data, as well as the image reproduction unit 200 subjects the output from the quantization unit 103 in the coding unit 100 to the inverse quantization, the inverse DCT and the addition, thereby reconstructing an image, and stores the reconstructed image in the image reproduction memory 204. On the other hand, in the operation for generating the code B, the coding unit 110 is employed as a coding unit for generating the code B while the image reproduction memory 204, the motion vector detection unit 300, and the image reproduction unit 200 which are employed in the operation for generating the code A are commonly employed. Thus, according to the first embodiment, two kinds of codes can be generated by commonly employing the motion vector detection unit 300, the image reproduction memory 204, and the image reproduction unit 200.

A practical application in which the image coding apparatus according to the first embodiment that outputs two kinds of codes is adopted is a case where the code A is stored in a storage medium and the code B is transmitted to a communication line.

When the code is stored in a storage medium, the amount of generated bits is often controlled by performing the variable bit rate control. To be more specific, since it is required to record video during a prescribed period of time in the whole capacity of each storage medium at high image quality, more codes are allocated to video with lower coding efficiency, thereby to suppress deterioration in the image quality due to the coding. On the other hand, fewer codes are allocated to video with higher coding efficiency. The video with low coding efficiency is, for example, video having vigorous movements or video at scene change. An example of the video with higher coding efficiency is video having little movement and being close to still pictures.

When the code is transmitted to the communication line, the amount of generated bits is usually controlled by performing fixed bit rate control. More specifically, since the amount of data that can be transmitted in a unit time is defined for the transmission line, the prescribed amount of codes is transmitted regardless of the characteristics of video. Thus, even when the video with lower coding efficiency is inputted, it is required to perform coding with the prescribed amount of codes, resulting in a deteriorated image quality as compared to the coding under the variable bit rate control.

When the image coding apparatus outputs two kinds of codes, problems occur that the amount of data transferred from/to the memory is increased twice and that the circuit scale is increased twice. However, in the image coding apparatus according to the first embodiment, the coding units share the motion vector detection unit 300, the image reproduction memory 204, and the image reproduction unit 200, thereby preventing the amount of transferred data and the circuit scale from being increased. In this first embodiment, however, the image reconstruction is performed using only one of the codes while another image reconstruction is not performed at decoding of the other code and the image that was reconstructed with the one of the codes is employed, so that errors are unfavorably stored when the image includes some errors. Accordingly, for example when two kinds of codes are outputted, i.e., the code A that is stored in a storage medium and the code B is transmitted to the transmission line, the code A that is coded at the variable bit rate provides a better image at the decoding than the code B that is coded at the fixed bit rate. Therefore, the image reproduction unit 200 reconstructs an image using the output from the coding unit 100 that encodes the code A. Thereby, also when the code B that has been encoded employing the image reconstructed on the basis of the code A is to be decoded, the decoding is performed with high image quality.

Here, the description has been given of the example where the code A is obtained by the coding at the variable bit rate and the code B is obtained by the coding at the fixed bit rate, and data that has been coded at the variable bit rate is employed to reconstruct an image. However, the data that is employed by the image reproduction unit 200 to reconstruct an image may be any data that is outputted from the coding unit 100 that generates coded data that provides the best image at the decoding. For example, when the coding units have different coding bit rates at which the coding is performed, the image reproduction unit 200 may reconstruct an image utilizing data outputted from a coding unit that performs coding at the highest coding bit rate.

Figure 2:
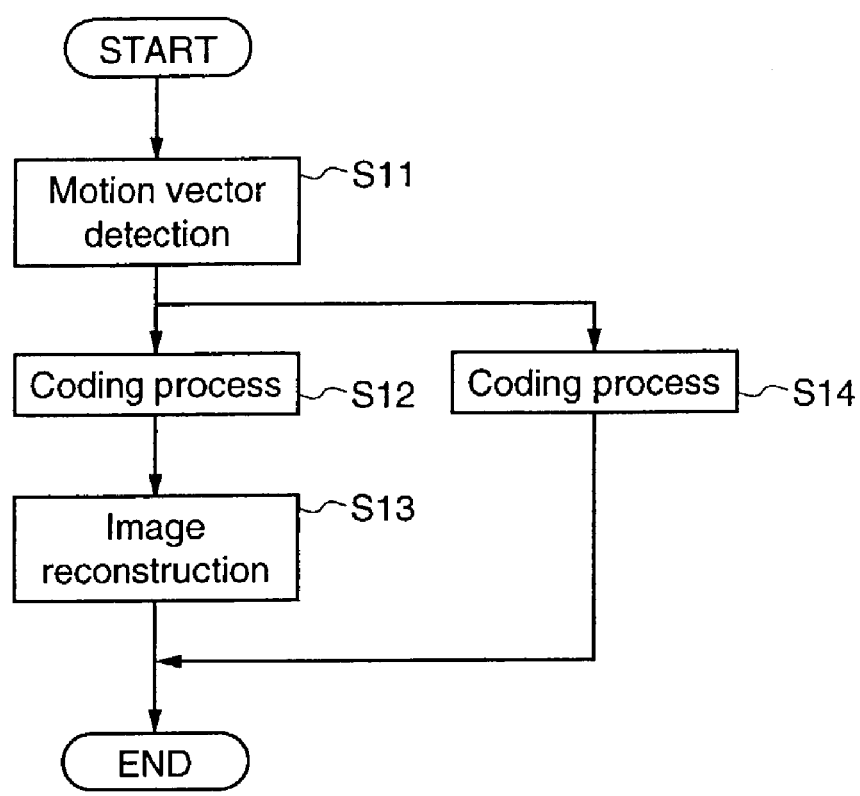
FIG. 2 is a flowchart for explaining an operation of the image coding apparatus according to the first embodiment.

Next, a method for obtaining two kinds of codes according to the present invention will be described with reference to a flowchart of FIG. 2.

Initially, the motion vector detection unit 300 divides a coding target image into predetermined blocks, and extracts a block in a search image that is obtained from the image reproduction memory 204, having the highest correlation with each of the obtained predetermined blocks, thereby detecting a motion vector (step S11).

Next, the coding unit 100 encodes the motion vector that is obtained in Step S11 as well as performs motion compensation inter-frame prediction using an image in a position indicated by the motion vector in the search image obtained from the image reproduction memory 204, and the original image that is inputted from the outside, in accordance with the given coding parameter 1, thereby generating coded data, i.e., a code A (step S12).

The image reproduction unit 200 reconstructs an image by using data outputted from the coding unit 100, and stores the reconstructed image in the image reproduction memory 204 (step S13).

On the other hand, the coding unit 110 encodes the motion vector that is obtained in step S11 as well as performs motion compensation inter-frame prediction with using the image in the search image obtained from the image reproduction memory 204, which is located in the position indicated by the motion vector, and the original image that is inputted from the outside as the coding target image, in accordance with a given coding parameter 2, thereby generating coded data, i.e., a code B (step S14). The operations of step S12 and step S14 are carried out in parallel.

Then, the above-mentioned processes from steps S11 to S14 terminate the generation of the codes A and B.

In the first embodiment, the image coding apparatus is provided with two coding units to generate two kinds of codes. However, an image coding apparatus which generates plural kinds of codes can be easily obtained by providing plural coding units that generate coded data and an image reproduction unit that reconstructs an image by using the coded data that is outputted from one of the plural coding units.

Further, in this first embodiment, the amounts of already-generated codes are given to the coding units 100 and 110 as the coding parameters 1 and 2, respectively, and the control is performed in units of the coding units 100 and 110. However, the coding parameters may be given at least to the quantization units 103 and 113 in the coding units 100 and 110, thereby controlling the amounts of generated codes in the quantization units.

In this first embodiment, the coding units 100 and 110 include the motion compensation unit and the DCT unit, respectively. However, when the motion compensation units and the DCT units in the coding units 100 and 110 perform the same processing, the coding units 100 and 110 may share one motion compensation unit and one DCT unit, like the motion vector detection unit, thereby to reduce the circuit scale.

Further, according to this first embodiment, the coding units output two kinds of codes of the same code format, while a conversion circuit for converting a code so as to have a specific code length, a circuit for adding data indicating characteristics of the code or the like may be added in the latter stage of the variable length coding unit, thereby enabling to be adapted to different code formats. In this case, when the image reconstruction is performed using one of the two codes having a larger amount, a smaller error occurs in the code and accordingly deterioration in the image quality at the decoding is reduced.

According to the first embodiment, in the image coding apparatus that generates plural kinds of coded data, the coding units share the image reproduction unit 200, the image reproduction memory 204, and the motion vector detection unit 300, thereby to reduce the circuit scale, as well as the image coding apparatus requires only one set of processing by the motion vector detection unit and the image reproduction unit, thereby to reduce the processing time. Further, the image reproduction unit 200 reconstructs an image by using coded data that is outputted from the coding unit 100. Therefore, also when plural kinds of coded data are generated, the amount of data transferred from the image reproduction unit 200 to the image reproduction memory 204 can be made equivalent to that in the case where one kind of coded data is generated, whereby the image coding apparatus having a lower system cost can be provided without increasing the circuit scale, the number of data pins, or the processing time.

EMBODIMENT 2

Figure 3:
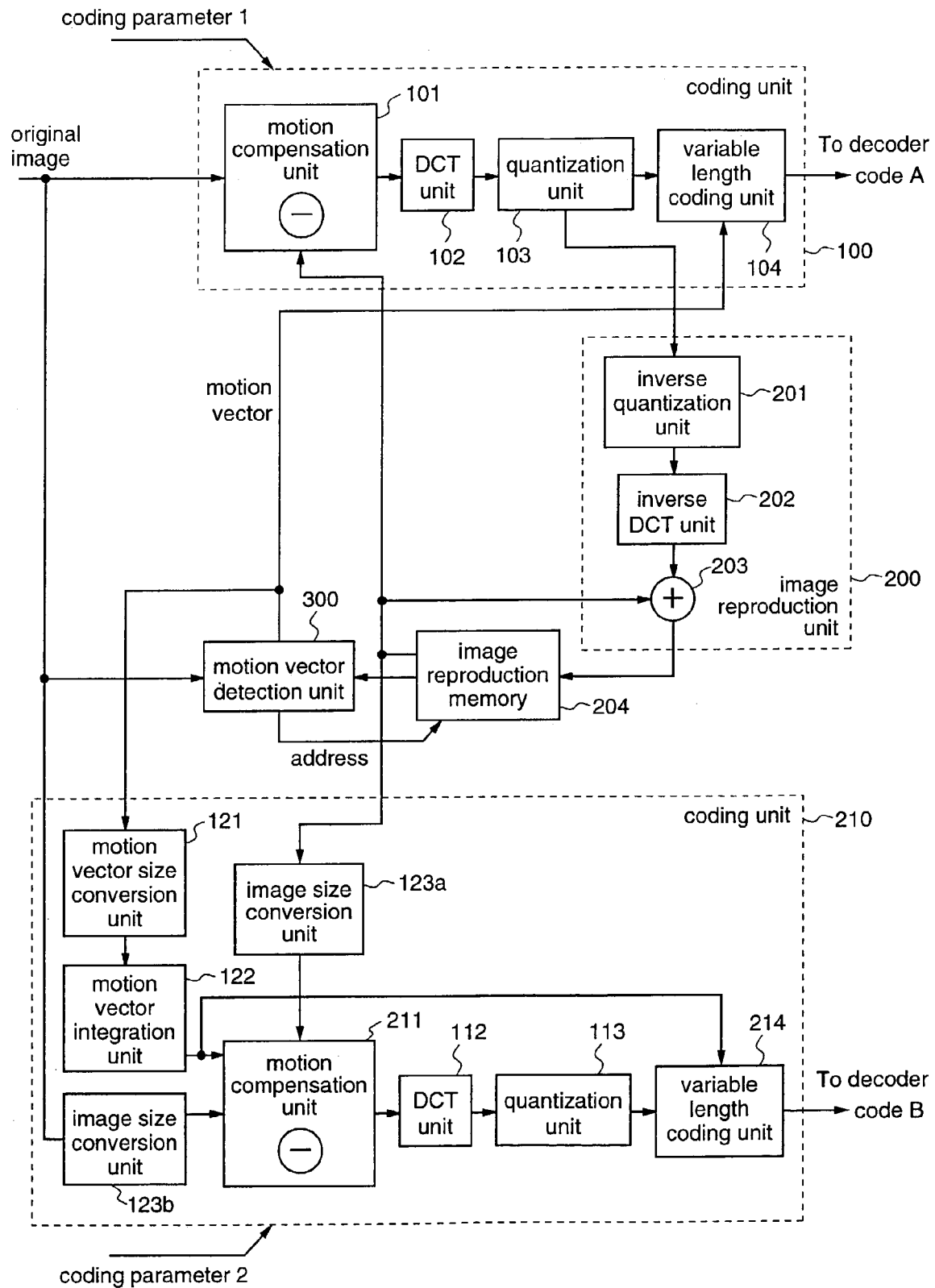
FIG. 3 is a diagram for explaining a structure of an image coding apparatus according to a second embodiment of the present invention.

FIG. 3 is a diagram for explaining a structure of an image coding apparatus according to a second embodiment of the present invention. A coding unit 210 of the image coding apparatus shown in FIG. 3 includes the coding unit 110 of the image coding apparatus according to the first embodiment, as described with reference to FIG. 1, and further a motion vector size conversion unit 121, a motion vector integration unit 122, and image size conversion units 123a and 123b.

In FIG. 3, numeral 121 denotes a motion vector size conversion unit that converts the size of the motion vector calculated by the motion vector detection unit 300 (first motion vector) according to a screen size conversion rate, in accordance with a given coding parameter 2. Numeral 122 denotes a motion vector integration unit that integrates motion vectors that are obtained by the motion vector size conversion unit 121 (second motion vector), thereby generating a motion vector corresponding to each processing unit for coding the target image whose size has been converted (third motion vector). Numeral 123a denotes an image size conversion unit that converts the size of an image supplied from the image reproduction memory 204, which is located in a position indicated by the motion vector, in accordance with the given coding parameter 2 (second image size conversion unit). Numeral 123b denotes an image size conversion unit that converts the size of the original image as the coding target image, in accordance with coding parameter 2 (first image size conversion unit). Here, the components other than the above-mentioned units are the same as those shown in the first embodiment.

Next, the operation of the image coding apparatus will be described.

The operations of the coding unit 100, the image reproduction unit 200, and the motion vector detection unit 300 are the same as those in the first embodiment.

Then, the operations of the coding unit 210, the image reproduction unit 200, and the motion vector detection unit 300 are described. Here, information indicating the image size is inputted to the coding unit 210 as the coding parameter 2.

The motion vector detection unit 300 detects a motion vector using the original image (coding target image) that is inputted from the outside and the search image that is supplied from the image reproduction memory 204, thereby supplying the detected motion vector to the image reproduction memory 204, as well as the motion vector size conversion unit 121 and the motion vector integration unit 122 process the detected motion vector, thereby to supply the processed motion vector to the variable length coding unit 214.

The image reproduction memory 204 reads an image in a position indicated by the motion vector (address in the image reproduction memory 204), and supplies the image to the motion compensation unit 211 through the image size conversion unit 123a.

The motion compensation unit 211 performs motion compensation using image data which is obtained by converting the size of a reproduced image that is inputted from the image reproduction memory 204 by means of the image size conversion unit 123a, and image data which is obtained by converting the size of the original image that is inputted from the outside by means of the image size conversion unit 123b, and then the obtained data is passed through the DCT unit 212, the quantization unit 213, and the variable length coding unit 214, thereby outputting coded data.

The variable length coding unit 214 also performs coding of the motion vector that is generated by means of the motion vector detection unit 300, the motion vector size conversion unit 121, and the motion vector integration unit 122.

Thus, the coding unit 210 that is constituted by the motion vector size conversion unit 121, the motion vector integration unit 122, the image size conversion units 123a and 123b, the motion compensation unit 211, the DCT unit 212, the quantization unit 213, and the variable length coding unit 214 controls the amount of coded data in accordance with the coding parameter 2 inputted from the outside, which is information indicating the image size.

The present invention is characterized in that the image reconstruction associated with the coding unit 210 is not performed after the data is coded as described above by the coding unit 210. In the image coding apparatus according to the second embodiment, in the operation for generating the code A, the motion vector is detected by the motion vector detection unit 300 using an image in the image reproduction memory 204, and coded data is generated by the coding unit 100, as well as the output from the quantization unit 103 in the coding unit 100 is subjected by the image reproduction unit 200 to the inverse quantization, the inverse DCT, and the addition, thereby to reconstruct an image, and the reconstructed image is stored in the image reproduction memory 204. On the other hand, in the operation for generating the code B, the coding unit 210 is employed as a coding unit for generating the code B, while commonly utilizing the image reproduction memory 204, the motion vector detection unit 300 and the image reproduction unit 200 which are used for generating the code A. Thus, in this second embodiment, two kinds of codes are generated by commonly employing the motion vector detection unit 300, the image reproduction memory 204, and the image reproduction unit 200.

A practical example of the second embodiment in which two kinds of codes are outputted is a case where a screen size consisting of 704 pixels×480 lines is subjected to coding according to MPEG2, thereby obtaining the code A, and a screen size consisting of 352 pixels×240 lines is subjected to coding according to MPEG4, thereby obtaining the code B.

In this case, more specifically, the coding is performed after the image size is converted by the image size conversion units 123a and 123b so as to reduce the horizontal and vertical dimensions to half, respectively. Further, the motion vector size conversion unit 121 converts the size of the motion vector that is supplied from the motion vector detection unit 300 so as to reduce the horizontal and vertical dimensions to half, as in the case of the image size conversion. Then, the motion vector integration unit 122 generates a motion vector, and thereafter the coding is performed.

Here, the operation of the motion vector integration unit 122 according to this example will be specifically described.

According to MPEG2 or MPEG4, the motion vector is obtained in units of a coding unit, which is referred to as a macroblock (MB) consisting of 16 pixels×16 lines. The size of the preconversion macroblock is converted by the image size conversion units 123a and 123b, into 8 pixels×8 lines, while the coding is performed according to MPEG4 in units of the macroblock consisting of 16 pixels×16 lines, so that one macroblock has four kinds of motion vectors corresponding to 8 pixels×8 lines. The motion vector integration unit 122 generates one motion vector from the four kinds of motion vectors. As methods for generating one motion vector from four kinds of motion vectors, there are for example a method in which four kinds of vectors are averaged, and a method in which plural motion vectors having higher correlation are selected among four motion vectors, and then the selected vectors are averaged.

Figure 4:
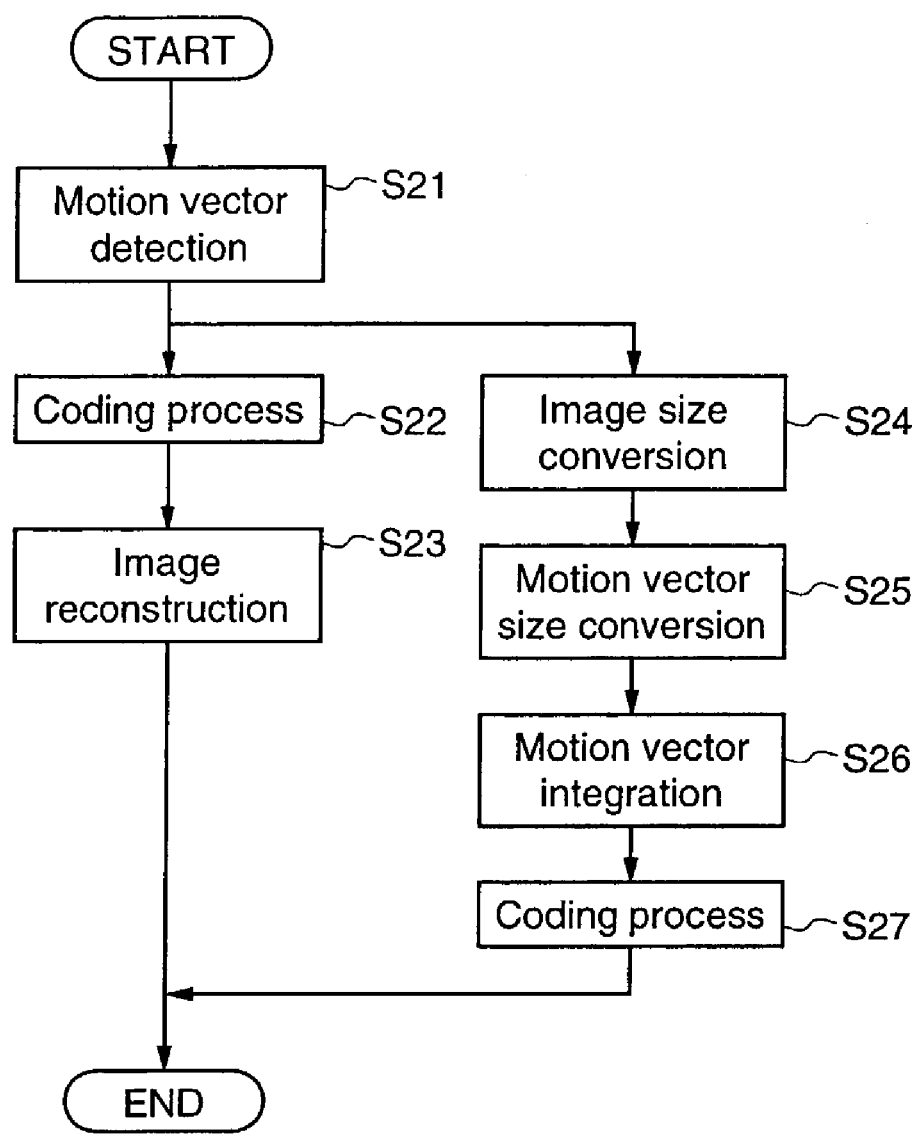
FIG. 4 is a flowchart for explaining an operation of the image coding apparatus according to the second embodiment.

Next, a method for coding images having two different sizes according to the present invention will be described with reference to a flowchart of FIG. 4.

Initially, the motion vector detection unit 300 divides a coding target image into predetermined blocks, and extracts a block in a search image that is obtained from the image reproduction memory 204, having the highest correlation with each of the obtained predetermined blocks, thereby detecting a motion vector (step S21).

Then, the coding unit 100 encodes the motion vector obtained in step S21 in accordance with an inputted coding parameter 1, as well as performs motion compensation inter-frame prediction using an image in a position indicated by the motion vector in a search image obtained from the image reproduction memory 204 and the original image that is inputted from the outside, thereby generating coded data, i.e., the code A (step S22).

The image reproduction unit 200 reconstructs an image by using data outputted from the coding unit 100, and stores the reconstructed image in the image reproduction memory 204 (step S23).

On the other hand, in the coding unit 210, in accordance with an inputted coding parameter 2, the image size conversion unit 123a converts the size of the image in the position indicated by the motion vector in the search image that is outputted from the image reproduction memory 204, as well as the image size conversion unit 123b converts the size of the original image as the coding target image (step S24).

In the coding unit 210 further, in accordance with the inputted coding parameter 2, the motion vector size conversion unit 121 converts the size of the motion vector obtained in step S21 according to the screen size conversion rate (step S25), and thereafter the motion vector integration unit 122 integrates the motion vectors converted according to the screen size conversion rate, thereby generating a motion vector corresponding to each of the processing unit for performing the coding of the coding target image which size has been converted (step S26).

The coding unit 210 encodes the motion vector obtained in step S26 as well as performs motion compensation inter-frame prediction by using the image obtained from the image size conversion unit 123a and the image obtained from the image size conversion unit 123b, thereby generating coded data, i.e., the code B (step S27). The operation in step S22 and the operations from step S24 to S27 are carried out in parallel.

The above-mentioned processes from steps S21 to S27 terminate the generation of the codes A and B.

In this second embodiment, the image coding apparatus includes two coding units and generates two kinds of codes. However, an image coding apparatus that generates plural kinds of codes can be easily obtained by providing plural coding units that generate coded data, and an image reproduction unit that reconstructs an image by using coded data that is outputted from one of the plural coding units.

Further, in this second embodiment, only the coding unit 210 includes the motion vector size conversion unit 121, the motion vector integration unit 122 and the image size conversion units 123a and 123b, and converts the size of the image in accordance with the coding parameter, thereby performing coding. However, the coding unit 100 may have the same construction as that of the coding unit 210, and convert the image size to perform coding.

When data are coded by plural coding units, data that is used by the image reproduction unit 200 to reconstruct an image may be one from the coding unit 100 that provides the best image at the decoding so that the image reconstructed by the image reproduction unit 200 does not include an error. In this case, data from a coding unit that performs coding at the highest coding bit rate or data from a coding unit that performs coding at a variable bit rate is employed by the image reproduction unit 200 to reconstruct an image.

Further, in this second embodiment, in the case where a system that outputs two kinds of codes subjects a screen size consisting of 704 pixels×480 lines to the coding according to MPEG2, thereby obtaining the code A and subjects a screen size consisting of 352 pixels×240 lines to the coding according to MPEG4, thereby obtaining the code B, the horizontal and vertical dimensions of the screen are reduced to half, respectively. However, the present invention is not restricted to this example, and the original image can be converted into a size having the horizontal dimension that is reduced to 1/H (H is a natural number) and the vertical dimension that is reduced to 1V (V is a natural number).

Further, even when the order of the processes in the coding unit by the motion vector size conversion unit 121 that converts the size of the motion vector that is supplied from the motion vector detection unit according to the screen size and by the motion vector integration unit 122 that integrates the motion vector that is supplied from the motion vector detection unit is changed, the coding unit can finally generates the motion vector corresponding to the screen size and can encode the same without any problem.

Thus, according to the second embodiment, in the image coding apparatus that generates plural kinds of coded data, the coding units share the image reproduction unit 200, the image reproduction memory 204, and the motion vector detection unit 300, thereby to reduce the circuit scale, and requires only a set of processes by the motion vector detection unit and the image reproduction unit, thereby to also reduce the processing time. Further, the image reproduction unit 200 reconstructs an image by using coded data that is outputted from the coding unit 100. Therefore, also when plural kinds of coded data are generated, the amount of data transferred from the image reproduction unit 200 to the image reproduction memory 204 can be made equivalent to that in the case where one coded data are generated, whereby an image coding apparatus having a lower system cost can be provided, without increasing the circuit scale, the number of data pins, or the processing time.

Further, in this second embodiment, the coding unit 210 includes the image size conversion units 123a and 123b, the motion vector size conversion unit 121, and the motion vector integration unit 122, whereby coded data corresponding to different image sizes can be generated.

EMBODIMENT 3

Figure 5:
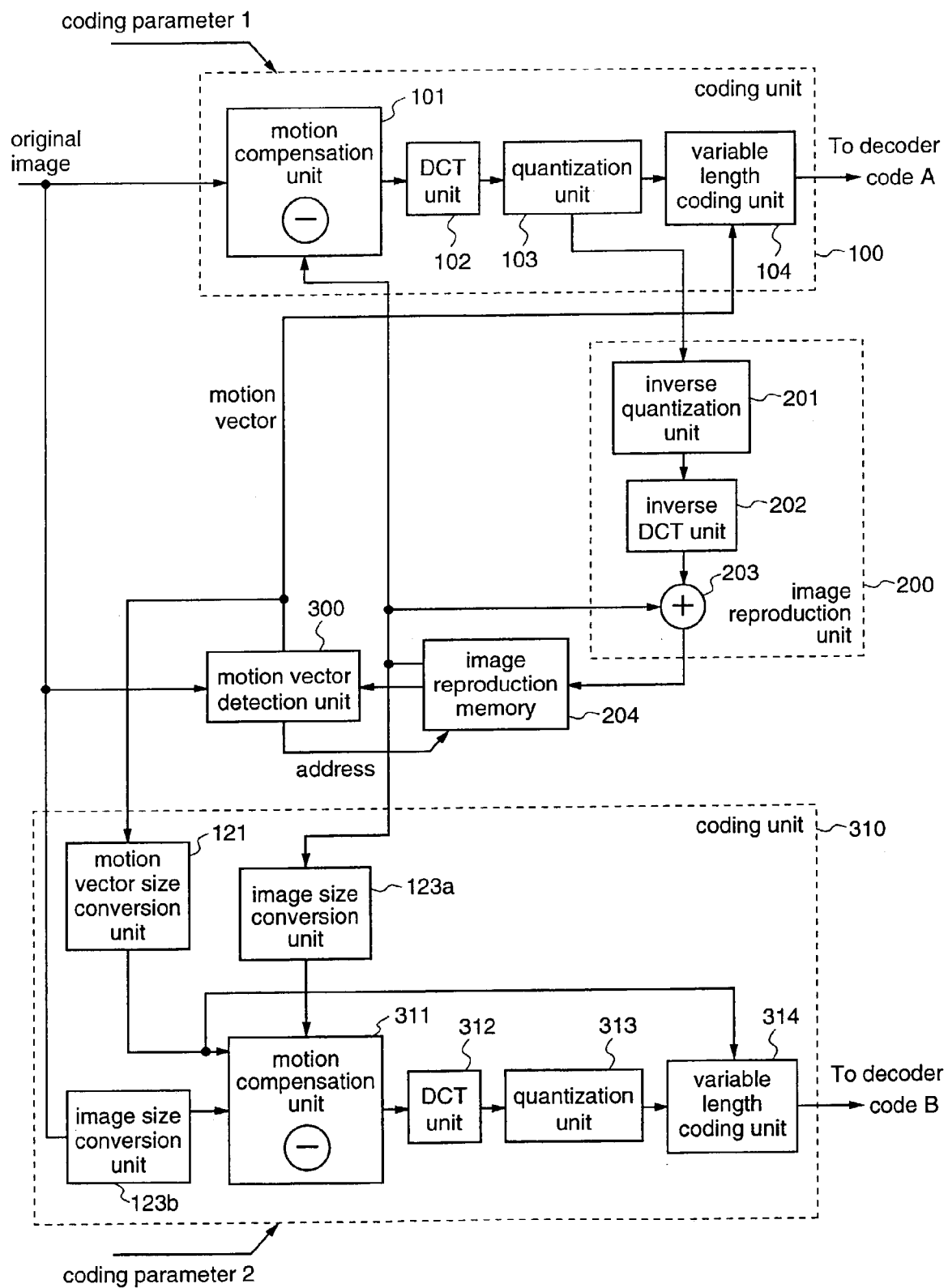
FIG. 5 is a diagram for explaining a structure of an image coding apparatus according to a third embodiment of the present invention.

FIG. 5 is a diagram for explaining a structure of an image coding apparatus according to a third embodiment of the present invention. As shown in FIG. 5, the motion vector integration unit 122 is removed from FIG. 3 that describes the second embodiment.

Next, the operation of the image coding apparatus according to the third embodiment will be described.

The operations of the coding unit 100, the image reproduction unit 200, and the motion vector detection unit 300 are the same as those in the first embodiment.

Then, the operations of a coding unit 310, the image reproduction unit 200, and the motion vector detection unit 300 will be described. It is assume here that information indicating the image size is inputted to the coding unit 310 as a coding parameter 2.

In FIG. 5, the motion vector detection unit 300 detects a motion vector (first motion vector) by using the original image that is inputted from the outside and a search image that is supplied from the image reproduction memory 204, and supplies the detected motion vector to the image reproduction memory 204 as well as to the variable length coding unit 314 through the motion vector size conversion unit 121.

The image reproduction memory 204 reads an image in a position indicated by the motion vector (address in the image reproduction memory 204), and supplies the image to the motion compensation unit 311 through the image size conversion unit 123a (second image size conversion unit).

The motion compensation unit 311 performs motion compensation using image data that is obtained by converting the size of the reproduced image that is inputted from the image reproduction memory 204 by means of the image size conversion unit 123a, and image data that is obtained by converting the size of the original image that is inputted from the outside by means of the image size conversion unit 123b (first image size conversion unit), and obtained data is passed through the DCT unit 312, the quantization unit 313 and the variable length coding unit 314, thereby outputting a code B.

The variable length coding unit 314 also performs coding of a motion vector (second motion vector) that is obtained by converting the motion vector detected by the motion vector detection unit 300 by means of the motion vector size conversion unit 121 according to the screen size conversion rate when generating the code B.

Thus, the coding unit 310 that is constituted by the motion vector size conversion unit 121, the image size conversion units 123a and 123b, the motion compensation unit 311, the DCT unit 312, the quantization unit 313, and the variable length coding unit 314 controls the amount of coded data in accordance with the coding parameter 2 that is inputted from the outside as the information indicating the image size.

The present invention is characterized in that the image reconstruction associated with the coding unit 310 is not performed after the coding unit 310 encodes the data as described above. According to the image coding apparatus of the third embodiment, in the operation for generating the code A, the motion vector detection unit 300 detects the motion vector by using the image obtained from the image reproduction memory 204, whereby the coding unit 100 generates the coded data, as well as the output from the quantization unit 103 in the coding unit 100 is subjected to the inverse quantization, the inverse DCT, and the addition in the image reproduction unit 200 to reconstruct an image, and the reconstructed image is stored in the image reproduction memory 204. On the other hand, in the operation for generating the code B, the coding unit 310 is employed as a coding unit for generating the code B while commonly utilizing the image reproduction memory 204, the motion vector detection unit 300, and the image reproduction unit 200 which are used for generating the code A. Therefore, in the third embodiment, two kinds of codes can be generated by commonly utilizing the motion vector detection unit 300, the image reproduction memory 204, and the image reproduction unit 200.

A practical example of the third embodiment in which two kinds of codes are outputted is a case where the screen size consisting of 704 pixels×480 lines is subjected to the coding according to MPEG2, thereby obtaining the code A, and the screen size consisting of 352 pixels×240 lines is subjected to the coding according to MPEG4, thereby obtaining the code B.

Figure 6:
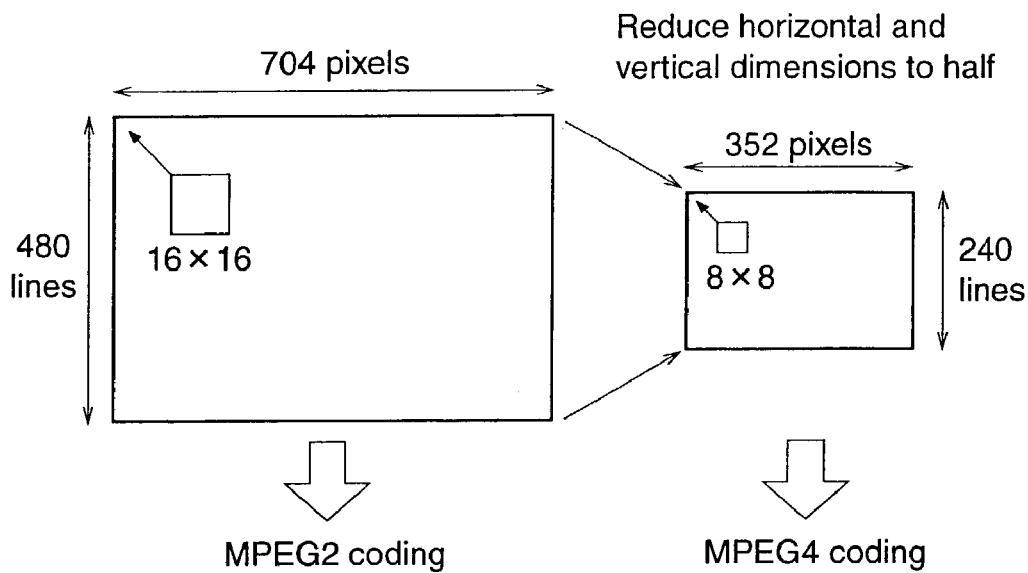
FIG. 6 is a diagram showing an example in which the screen size is converted by the image coding apparatus according to the third embodiment.

More specifically, as shown in FIG. 6, the image size conversion units 123a and 123b converts the image size so as to reduce the horizontal and vertical dimensions to half, respectively. Further, the motion vector size conversion unit 121 converts the size of the motion vector that is supplied from the motion vector detection unit 300 so as to reduce the horizontal and vertical dimensions to half, respectively, as in the case of the image size conversion, and then encodes the same, thereby outputting the code B.

The reason why the motion vector integration unit 122 in the second embodiment is dispensed with in the third embodiment will be given here.

As described in the second embodiment, according to MPEG2 or MPEG4, the motion vector is obtained in units of coding, which unit is referred to as a macroblock (MB) consisting of 16 pixels×16 lines, while the specifications of MPEG4 also enable coding of a motion vector in units consisting of 8 pixels×8 lines. Accordingly, it is not required to generate one kind of motion vector corresponding to a unit consisting of 16 pixels×16 lines from four kinds of motion vectors corresponding to a unit that consists of 8 pixels×8 lines, using the motion vector integration unit 122.

Figure 7:
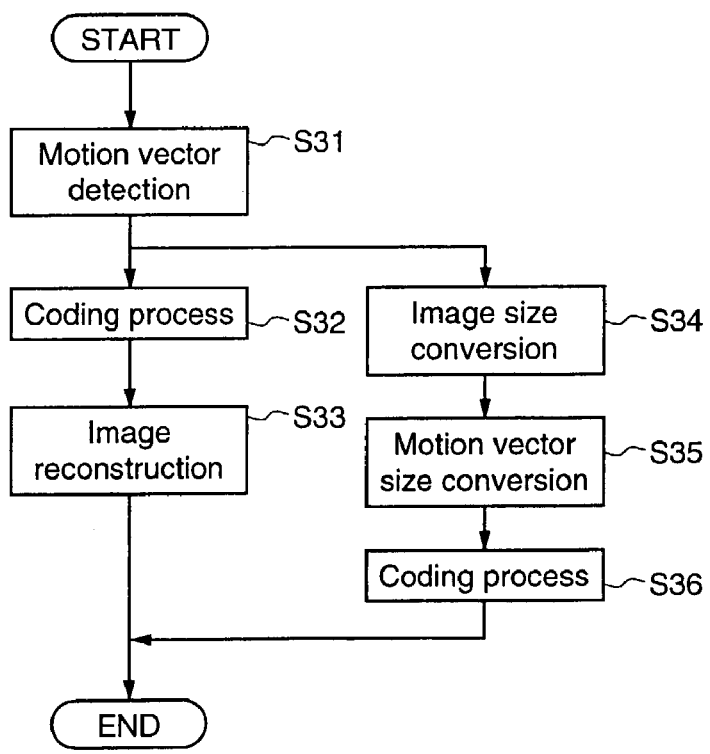
FIG. 7 is a flowchart for explaining an operation of the image coding apparatus according to the third embodiment.

Next, a method for coding data having two different image sizes will be described with reference to a flowchart of FIG. 7.

Initially, the motion vector detection unit 300 divides a coding target image into predetermined blocks, and extracts a block in a search image that is obtained from the image reproduction memory 204, having the highest correlation with each of the predetermined blocks, thereby detecting a motion vector (step S31).

Then, in accordance with the inputted coding parameter 1, the coding unit 100 encodes the motion vector that is obtained in step S31, as well as performs motion compensation inter-frame prediction by using an image in a position indicated by the motion vector in the search image obtained from the image reproduction memory 204 and the original image that is inputted from outside, thereby generating coded data, i.e., a code A (step S32).

The image reproduction unit 200 reconstructs an image by using data outputted from the coding unit 100, and stored the reconstructed image in the image reproduction memory 204 (step S33).

On the other hand, in the coding unit 310, in accordance with an inputted coding parameter 2, the image size conversion unit 123a converts the size of an image in a position indicated by the motion vector in the search image outputted from the image reproduction memory 204, as well as the image size conversion unit 123b converts the size of the original image as the coding target image (step S34).

Further, in the coding unit 310, in accordance with the inputted coding parameter 2, the motion vector size conversion unit 121 converts the size of the motion vector that is obtained in step S31 according to the screen size conversion rate (step S35).

The coding unit 310 encodes the motion vector obtained in step S35 as well as performs motion compensation inter-frame prediction by using the image obtained by the image size conversion unit 123a and the image obtained by the image size conversion unit 123b, thereby generating coded data, i.e., a code B (step S36). The operation in step S32 and the operations from steps S34 to S36 are carried out in parallel.

The above-mentioned processes from steps S31 to S36 terminate the generation of the codes A and B.

In this third embodiment, the image coding apparatus includes two coding units, and generates two kinds of codes.

However, an image coding apparatus that generates plural kinds of codes can be easily obtained by providing plural coding units that generate coded data and an image reproduction unit that reconstructs an image using coded data that is outputted from one of the plural coding units.

Further, in this third embodiment, only the coding unit 310 includes the motion vector size conversion unit 121, and the image size conversion units 123*a* and 123*b*, thereby to convert data to have an image size indicated by a coding parameter, and encodes the converted data. However, the coding unit 100 may have the same structure as that of the coding unit 310, thereby converting the image size and performing the coding.

When data are encoded by plural coding units, data that is used by the image reproduction unit 200 to reconstruct an image may be one from the coding unit 100 that generates coded data, which provides the best image at the decoding, so that the image reconstructed by the image reproduction unit 200 includes no error. More specifically, data from a coding unit that performs coding at the highest coding bit rate or data from a coding unit that performs coding at a variable bit rate can be employed by the image reproduction unit 200 to reconstruct the image.

Further, in this third embodiment, the code B is obtained by performing the motion compensation utilizing a motion vector corresponding to 8 pixels×8 lines according to MPEG4, rather than utilizing a motion vector corresponding to 16 pixels×16 lines. However, when the image coding apparatus includes the motion vector integration unit 122 as shown in the second embodiment, the motion vector corresponding to 8 pixels×8 lines according to MPEG4 as shown in the third embodiment and the motion vector corresponding to 16 pixels×16 lines as shown in the second embodiment can be adaptively switched.

In this third embodiment, the code A is obtained by the coding according to MPEG2, while any coding methods that handle a motion vector in units consisting of 16 pixels×16 lines like MPEG2, for example coding method according to MPEG1, may apply to the third embodiment.

Thus, according to the third embodiment, in the image coding apparatus that generate plural kinds of coded data, the coding units share the image reproduction unit 200, the image reproduction memory 204, and the motion vector detection unit 300, thereby to reduce the circuit scale, and requires only a set of processes by the motion vector detection unit and the image reproduction unit, whereby the processing time is also reduced. Further, the image reproduction unit 200 employs coded data that is outputted from one of the coding units, i.e., the coding unit 100, to reconstruct an image. Therefore, also when plural coded data are generated, the amount of data transferred from the image reproduction unit 200 to the image reproduction memory 204 can be made equivalent to that in the case of generating one kind of coded data, whereby an image coding apparatus having a lower system cost can be provided without increasing the circuit scale, the number of data pins, or the processing time.

In this third embodiment, the code B is obtained by performing the motion compensation according to MPEG4 using a motion vector corresponding to 8 pixels×8 lines, not a motion vector corresponding to 16 pixels×16 lines, to perform the coding, whereby even when the motion vector integration unit as described in the second embodiment is not included, two kinds of codes corresponding to different image sizes can be generated.

EMBODIMENT 4

Figure 8:
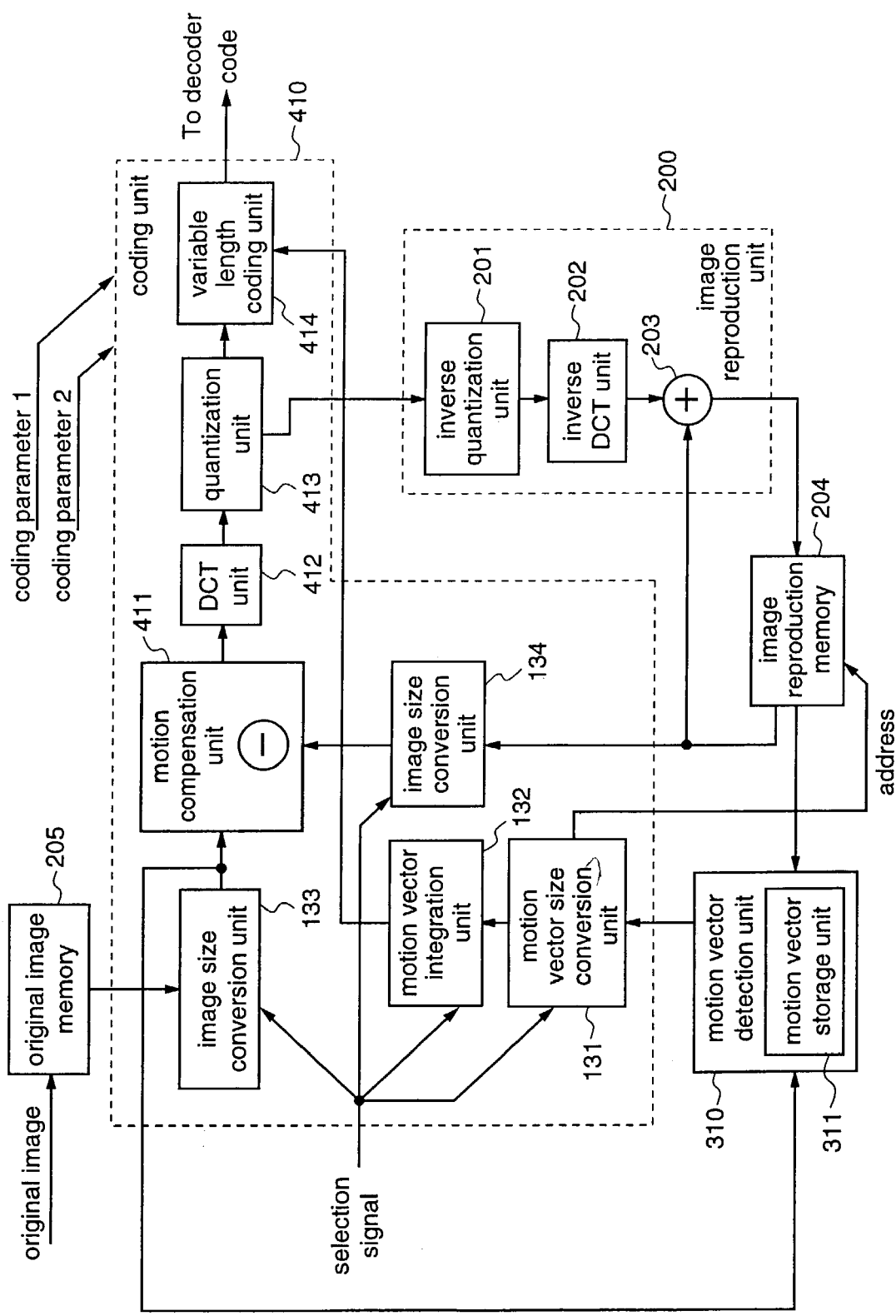
FIG. 8 is a diagram for explaining a structure of an image coding apparatus according to a fourth embodiment of the present invention.

FIG. 8 is a diagram for explaining a structure of an image coding apparatus according to a fourth embodiment of the present invention.

In FIG. 8, numeral 410 denotes a coding unit 410 that controls the amount of codes in accordance with plural coding parameters which are given to a coding target image, and successively generates coded data corresponding to each of the plural coding parameters. Numeral 200 denotes an image reproduction unit that reconstructs an image by using one kind of coded data that is generated by the coding unit 410. Numeral 310 denotes a motion vector detection unit that obtains a motion vector (first motion vector) on the basis of an evaluation value that is obtained by comparing the coding target image and a search image with each other.

Numeral 311 denotes a motion vector storage unit that stores the motion vector that is obtained by the motion vector detection unit 300.

Further, numeral 131 denotes a motion vector size conversion unit that converts the size of the motion vector that is detected by the motion vector detection unit 310 according to the image size conversion rate, thereby generating a motion vector (second motion vector) corresponding to the screen size conversion rate. Numeral 132 denotes a motion vector integration unit that decides a motion vector (third motion vector) corresponding to the image whose size has been converted, on the basis of the motion vector generated by the motion vector size conversion unit 131.

Numeral 133 denotes an image size conversion unit (first image size conversion unit) that converts the size of an inputted image as a coding target image. Numeral 134 denotes an image size conversion unit (second image size conversion unit) that converts the size of an image from the image reproduction memory 204 in a position indicated by the motion vector detected by the motion vector detection unit 310, and supplies the converted image to the motion compensation unit 411.

Numeral 411 denotes a motion compensation unit that performs motion compensation on the basis of the motion vector detected by the motion vector detection unit 310. Numeral 412 denotes a DCT unit, numeral 413 denotes a quantization unit, and numeral 414 denotes a variable length coding unit.

The coding unit 410 that is constituted by the motion vector size conversion unit 131, the motion vector integration unit 132, the image size conversion units 133 and 134, the motion compensation unit 411, the DCT unit 412, the quantization unit 413, and the variable length coding unit 414 controls the amount of codes in accordance with plural coding parameters which are inputted from the outside, and successively generates coded data corresponding to each of the plural coding parameters.

Numeral 201 denotes an inverse quantization unit, numeral 202 denotes an inverse DCT unit, and numeral 203 denotes an addition unit that adds an output from the inverse DCT unit and image data before motion compensation, thereby reconstructing an image. Numeral 204 denotes an image reproduction memory (second memory) that stores a reconstructed image, and numeral 205 denotes an original image memory (first memory) that stores the original image as the coding target image.

Next, the operation of the image coding apparatus will be described. Here, an image size selection signal that indicates the size of a coding image is given as the coding parameter.

The motion vector detection unit 310 detects a motion vector on the basis of a coding target block, which is obtained by the image size conversion unit 133 by processing the original image inputted from the outside, and a search range block that is supplied from the image reproduction memory 204.

The image reproduction memory 204 reads an image in a position indicated by the motion vector (address in the image reproduction memory 204), and passes the image to the image size conversion unit 134 to be supplied to the motion compensation unit 411.

The motion compensation unit 411 performs motion compensation by using image data that is obtained by converting the size of the reproduced image inputted from the image reproduction memory 204 by means of the image size conversion unit 134, and image data that is obtained by converting the size of the original image inputted from the outside by means of the image size conversion unit 133, and the obtained data is passed through the DCT unit 412, the quantization unit 413 and the variable length coding unit 414, thereby outputting coded data.

The variable length coding unit 414 also performs coding of the motion vector that is generated through the motion vector detection unit 310, the motion vector size conversion unit 131, and the motion vector integration unit 132.

Thus, the coding unit 410 that is constituted by the motion vector size conversion unit 131, the motion vector integration unit 132, the image size conversion units 133 and 134, the motion compensation unit 411, the DCT unit 412, the quantization unit 413, and the variable length coding unit 414 converts the image size in accordance with the image size selection signal that indicates the size of the coding image, which is inputted from the outside, thereby controlling the amount of data to be coded, and successively generates coded data corresponding to each of the plural coding parameters.

The image reproduction unit 200 reconstructs an image using one of coded data that is obtained by the coding unit 410, and stores the reconstructed image in the image reproduction memory 204.

Here, one of the coded data that is employed by the image reproduction unit 200 to reconstruct an image can be data corresponding to a coding parameter which provides the best image at the decoding, so that the image reconstructed by the image reproduction unit 200 includes no error. For example, data that has been coded in accordance with a coding parameter that indicates coding at the highest coding bit rate or data that has been coded in accordance with a coding parameter that indicates coding at a variable bit rate may be employed by the image reproduction unit 200 to reconstruct an image.

Further, in cases where data to be processed are for example data conforming to MPEG standards, when I picture (intra-frame coding image) or P picture (inter-frame forward predictive coding image) according to MPEG is to be processed, an output from the coding unit 100 is employed by the image reproduction unit 200 to reconstruct an image, thereby to utilize the reconstructed image as a search range frame image for coding of subsequent P or B pictures (bidirectional predictive coding image).

Figure 9:
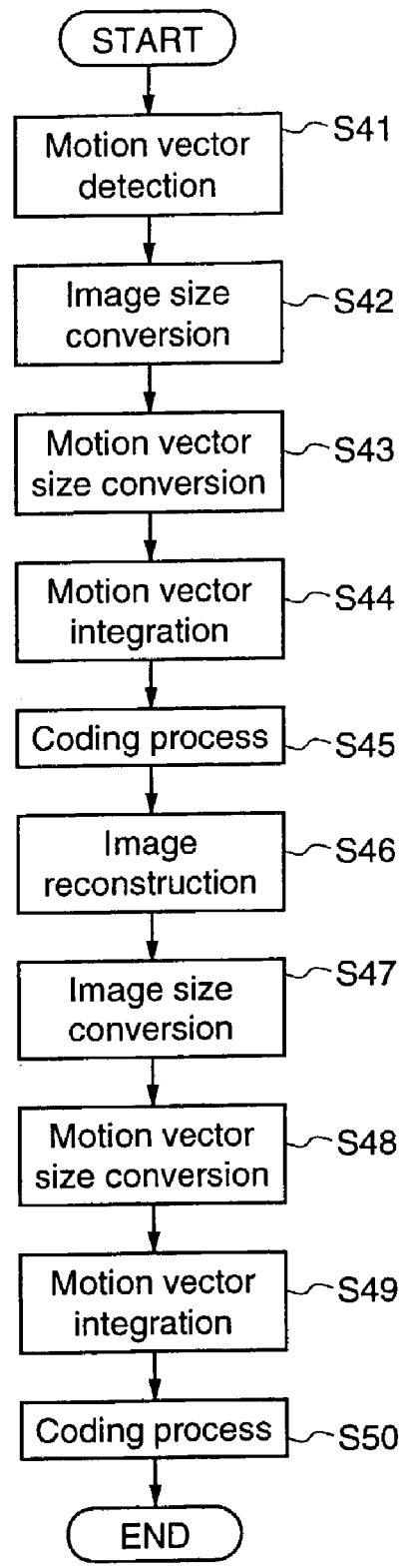
FIG. 9 is a flowchart for explaining an operation of the image coding apparatus according to the fourth embodiment.
Figure 10:
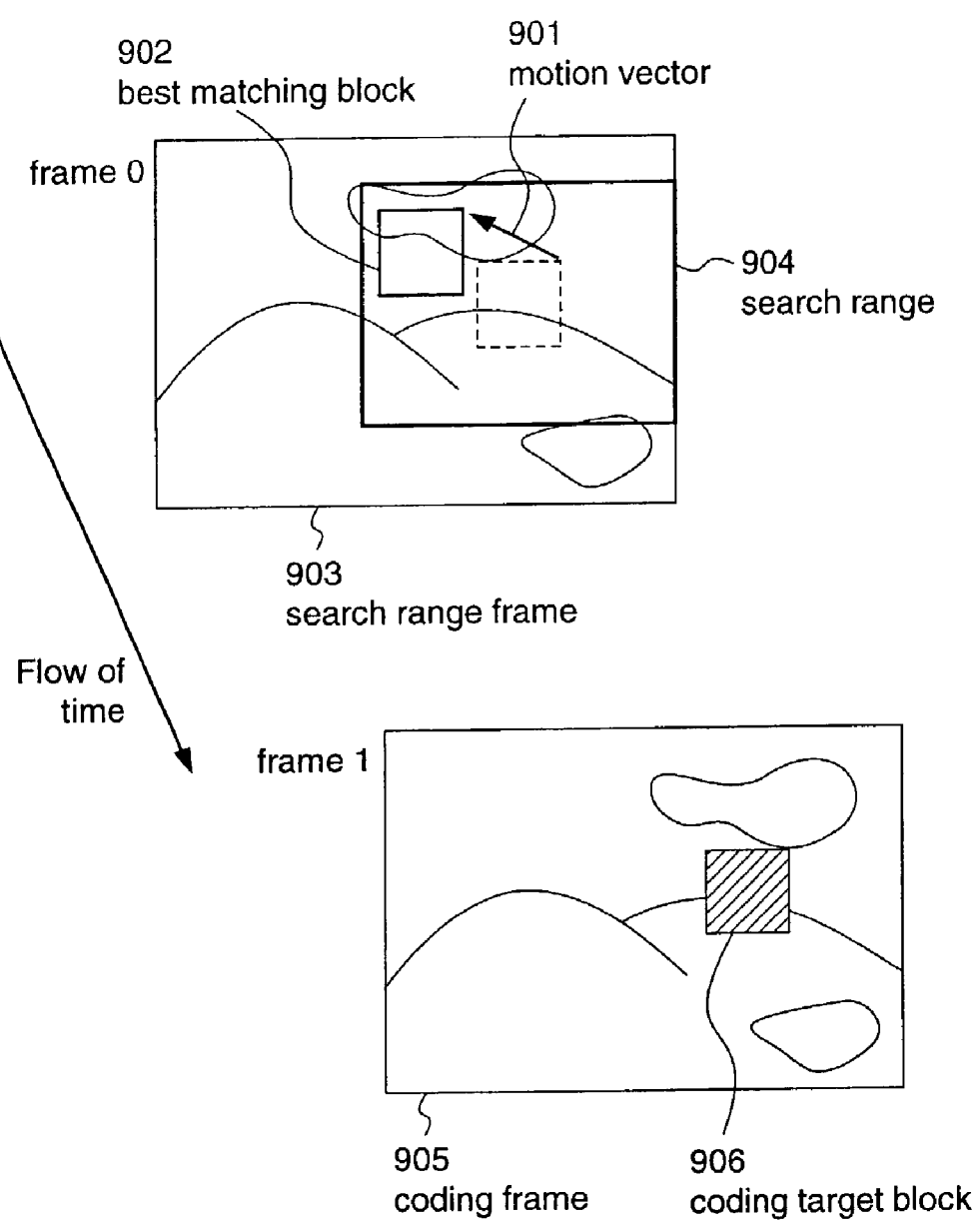
FIG. 10 is a diagram for explaining a block matching method according to an image coding apparatus.

Next, an image coding method by the image coding apparatus according to the fourth embodiment will be described with reference to a flowchart of FIG. 9. It is assumed here that two coding parameters are given for one coding target image, and that information indicating that coding is performed in the original image size is given as a coding parameter 1 while information indicating that coding is performed by converting the original image size to reduce the horizontal and vertical dimensions to ½, respectively, is given as a coding parameter 2.

Initially, the motion vector detection unit 310 divides the coding target image in predetermined blocks and extracts a block in a search image that is obtained from the image reproduction memory 204, having the highest correlation with each of the obtained predetermined blocks, thereby detecting a motion vector (step S41). At this time, the motion vector detected by the motion vector detection unit 310 is stored in the motion vector storage unit 311 in the motion vector detection unit 310 until coding of one coding target image is completed.

Then, the coding unit 410 carries out a process for generating coded data corresponding to the coding parameter 1, in steps S42 to S46.

To be more specific, in the coding unit 410, in accordance with the coding parameter 1 as information indicating that the coding is to be performed in the original size of the inputted original image, the image size conversion units 133 and 134 do not convert the size of the original image as the coding target image which is outputted from the original image memory 205, and the size of an image in the search image outputted from the image reproduction memory 204, which is located in a position indicated by the motion vector, and outputs the images which have been inputted to the image size conversion units 133 and 134 as they are, to the motion compensation unit 411 (step S42).

In the coding unit 410, similarly in accordance with the coding parameter 1, the motion vector that is obtained in step S41 is outputted as it is by the motion vector size conversion unit 131 and then the motion vector integration unit 132 to the variable length coding unit 104 (steps S43 and S44).

Then, the coding unit 410 encodes the motion vector that is outputted from the motion vector integration unit 132, as well as performs motion compensation inter-frame prediction by using the image that is obtained from the image size conversion unit 134 and the image that is obtained from the image size conversion unit 133, thereby generating coded data corresponding to the coding parameter 1, i.e., a code A (step S45).

The image reproduction unit 200 reconstructs an image employing the coded data that is obtained by the processing in the coding unit 410 in accordance with the coding parameter 1, and stores the reconstructed image in the image reproduction memory 204 (step S46).

Then, the coding unit 410 carries out a process for generating coded data corresponding to the coding parameter 2 in steps S47 to S50.

To be more specific, in the coding unit 410, in accordance with the coding parameter 2 as information indicating that coding is to be performed with the size of the inputted original image being converted to reduce the horizontal and vertical dimensions to half, respectively, the image size conversion unit 134 converts the size of the image in the search image that is outputted from the image reproduction memory 204, which is located in a position indicated by the motion vector, to reduce the horizontal and vertical dimensions to half, respectively, and the image size conversion unit 133 converts the size of the original image as the coding target image to reduce the horizontal and vertical dimensions to half, respectively, thereby outputting the converted image data to the motion compensation unit 411 (step S47).

In the coding unit 410 further, in accordance with the coding parameter 2, the motion vector size conversion unit 131 converts the size of the motion vector that is stored in the motion vector storage unit 311 adaptively to the size of the original image, which has been converted to reduce the horizontal and vertical dimensions to half in step S47 (step S48), and the motion vector integration unit 132 integrates the motion vector converted by the motion vector size conversion unit 131, thereby generating one motion vector corresponding to each of processing units for performing coding of the target image the size of which has been converted (step S49).

Then, the coding unit 410 encodes the motion vector that is outputted from the motion vector integration unit 132, as well as performs motion compensation inter-frame prediction using the image that is obtained by the image size conversion unit 134 and the image that is obtained by the image size conversion unit 133, thereby generating coded data corresponding to the coding parameter 2, i.e., a code B (step S50).

The above-mentioned processes from steps S41 to S50 terminate the coded data generation process in accordance with the two coding parameters which are given for one coding target image.

In this fourth embodiment, two coding parameters are given to the coding unit 410, thereby generating two kinds of codes. However, when plural coding parameters for one coding target image are given to the coding unit 410, the coding unit 410 carries out the above-mentioned processes from step S41 to step S46 for one of the plural coding parameters, and then repeatedly carries out the processes from step S47 to step S50 for the remaining coding parameters, thereby successively generating plural kinds of coded data each corresponding to each of the plural coding parameters.

In this fourth embodiment, the coding unit 410 is constituted by the motion compensation unit 411, the DCT unit 412, the quantization unit 413, the variable length coding unit 414, the motion vector size conversion unit 131, the motion vector integration unit 132, and the image size conversion units 133 and 134. However, when the coding unit 410 does not perform the image size conversion, the coding unit 410 may be constituted by the motion compensation unit 411, the DCT unit 412, the quantization unit 413, and the variable length coding unit 414.

Further, even when the order of the processes by the motion vector size conversion unit 131 that converts the size of the motion vector that is supplied from the motion vector detection unit 310 according to the screen size, and by the motion vector integration unit 132 that integrates the motion vector that is supplied from the motion vector detection unit 310 is changed in the coding unit, the motion vector corresponding to the screen size can be finally generated and coded without any problems.

Thus, in this fourth embodiment, plural coding parameters are given to the coding unit 410, and the coding unit 410 successively generates coded data corresponding to each of the plural coding parameters. Therefore, plural kinds of coded data can be generated without providing coding units corresponding to the plural coding parameters, respectively, whereby the entire circuit scale of the image coding apparatus can be reduced. Further, the image reproduction unit 200 reconstructs an image employing one kind of coded data generated by the coding unit 410. Therefore, also when plural kinds of coded data are to be outputted for one image input, the amount of data transferred from the image reproduction unit 200 to the image reproduction memory 204 can be made equivalent to that in the case where one kind of coded data is generated, whereby an image coding apparatus having a lower system cost can be provided without increasing the circuit scale, the number of data pins, or the processing time.

What is claimed is:

1. An image coding apparatus that outputs plural codes for one coding target image, utilizing motion compensation inter-frame prediction, including:
    a motion vector detection unit for dividing the coding target image into predetermined blocks and extracting a block in a search image, having a highest correlation with each of the predetermined blocks, thereby to detect a first motion vector for each of the predetermined blocks;
    N (N is an integer equal to two or larger than two) pieces of coding units for coding the first motion vector as well as performing motion compensation inter-frame prediction using an image in a position indicated by the first motion vector in the search image and the coding target image, in accordance with coding parameters which are given from outside, thereby to generate coded data;
    an image reproduction unit for reconstructing an image using coded data which is outputted from one of the coding units; and
    a reproduced image memory for storing the image reconstructed by the image reproduction unit as a search image that is to be supplied to the motion vector detection unit, wherein
    the N pieces of coding units encode the coding target image in accordance with the coding parameters which are given to the respective coding units, and output the respective coded data.

2. The image coding apparatus of claim 1 wherein
at least one of the N pieces of coding units further includes:
    a first image size conversion unit for converting the size of the coding target image;
    a second image size conversion unit for converting the size of the image supplied from the reproduced image memory, which image is located in the position indicated by the first motion vector;
    a motion vector size conversion unit for converting the size of the first motion vector according to a screen size conversion rate, thereby to generate a second motion vector; and
    a motion vector integration unit for integrating the second motion vector, thereby to generate a third motion vector corresponding to each of processing units for coding the coding target image that has been subjected to the image size conversion,
    all of the units operating in accordance with information that indicates the size of an image to be coded, which information is given to the coding unit as the coding parameter, and wherein
    said coding unit encodes the third motion vector that is supplied from the motion vector integration unit, as well as performs motion compensation inter-frame prediction using the coding target image supplied from the first image size conversion unit and the image supplied from the second image size conversion unit, thereby to generate coded data.

3. The image coding apparatus of claim 1 wherein
at least one of the N pieces of coding units further includes:
    a first image size conversion unit for converting the size of the coding target image;

a second image size conversion unit for converting the size of the image supplied from the reproduced image memory, which image is located in the position indicated by the first motion vector; and a motion vector size conversion unit for converting the size of the first motion vector according to a screen size conversion rate, thereby to generate a second motion vector, all of the units operating in accordance with information that indicates the size of an image to be coded, which information is given to the coding unit as the coding parameter, and wherein said coding unit encodes the second motion vector that is supplied from the motion vector size conversion unit, as well as performs motion compensation inter-frame prediction using the coding target image supplied from the first image size conversion unit, and the image supplied from the second image size conversion unit, thereby outputting coded data.

4. The image coding apparatus of claim 1 wherein said one coding unit that outputs coded data to the image reproduction unit is one selected from among the N pieces of coding units, which is given a coding parameter that indicates coding at a highest coding bit rate.

5. The image coding apparatus of claim 1 wherein said one coding unit that outputs coded data to the image reproduction unit is one selected among the N pieces of coding units, which is given a coding parameter that indicates coding at a variable bit rate.

6. An image coding apparatus that outputs plural codes for one coding target image, utilizing motion compensation inter-frame prediction, including:

a motion vector detection unit for dividing the coding target image into predetermined blocks and extracting a block in a search image, having a highest correlation with each of the predetermined blocks, thereby detecting a first motion vector for each of the predetermined blocks;

a first memory for storing the coding target image;

a coding unit for coding the first motion vector as well as performing motion compensation inter-frame prediction using an image in a position indicated by the first motion vector in the search image and the coding target image, in accordance with plural coding parameters which are supplied from outside to the one coding target image, thereby successively generating coded data corresponding to each of the plural coding parameters;

an image reproduction unit for reconstructing an image employing one of the coded data which are generated by the coding unit; and a second memory for storing the image reconstructed by the image reproduction unit as a search image that is supplied to the motion vector detection unit.

7. The image coding apparatus of claim 6 wherein the coding unit further includes:

a first image size conversion unit for converting the size of the coding target image that is stored in the first memory;

a second image size conversion unit for converting the size of the image supplied from the second memory, which image is located in the position indicated by the first motion vector;

a motion vector size conversion unit for converting the size of the first motion vector according to a screen size conversion rate, thereby to generate a second motion vector; and a motion vector integration unit for integrating the second motion vector and generating a third motion vector corresponding to each of processing units for performing coding of the coding target image, the size of which has been converted, all of the units operating in accordance with an image size selection signal indicating the size of an image to be coded, which signal is given to the coding unit as the coding parameter, and wherein said coding unit encodes the third motion vector that is supplied from the motion vector integration unit, as well as performs motion compensation inter-frame prediction using the coding target image that is supplied from the first image size conversion unit and an image that is supplied from the second image size conversion unit, thereby outputting coded data.

8. The image coding apparatus of claim 6 wherein the coded data outputted to the image reproduction unit is one that is obtained by coding data in accordance with one of the plural coding parameters supplied to the coding unit, which indicates coding at a highest bit rate.

9. The image coding apparatus of claim 6 wherein the coded data outputted to the image reproduction unit is one that is obtained by coding data in accordance with one of the plural coding parameters supplied to the coding unit, which indicate coding at a variable bit rate.

10. An image coding method for outputting plural codes for one coding target image, utilizing motion compensation inter-frame prediction, including:

a motion vector detection step of dividing the coding target image into predetermined blocks and extracting a block in a search image, having a highest correlation with each of the predetermined blocks, thereby detecting a first motion vector for each of the predetermined blocks;

a first coding step of coding the first motion vector as well as performing motion compensation inter-frame prediction using an image in a position indicated by the first motion vector in the search image and the coding target image, in accordance with a coding parameter that is given from outside, thereby to generate coded data;

an image reproduction step of reconstructing an image using the coded data that is generated in the first coding step;

a reproduced image storage step of storing the image reconstructed in the image reproduction step, as a search image to be employed in the motion vector detection step; and a second coding step of coding the first motion vector as well as performing motion compensation inter-frame prediction using the image in the position indicated by the first motion vector in the search image and the coding target image, in accordance with the coding parameter given from the outside, thereby to generate coded data, said first coding step and said second coding step being carried out in parallel.

11. The image coding method of claim 10 wherein
at least one of the first coding step and the second coding step is a step that is carried out in accordance with information indicating the size of an image to be coded, which information is given as the coding parameter, and further includes:
- a first image size conversion step of converting the size of the coding target image;
- a second image size conversion step of converting the size of the image supplied from the reproduced image memory, which image is located in the position indicated by the first motion vector;
- a motion vector size conversion step of converting the size of the first motion vector according to a screen size conversion rate, thereby to generate a second motion vector; and
- a motion vector integration step of integrating the second motion vector, and generating a third motion vector corresponding to each of processing units for performing coding of the coding target image, the size of which has been converted, and further
  - the third motion vector that is generated in the motion vector integration step is encoded, as well as motion compensation inter-frame prediction is performed using a coding target image generated in the first image size conversion step and an image generated in the second image size conversion step, thereby outputting coded data.

12. The image coding method of claim 10 wherein
at least one of the first coding step and the second coding step is a step that is carried out in accordance with information indicating the size of an image to be coded, which is supplied as the coding parameter, and further includes:
- a first image size conversion step of converting the size of the coding target image;
- a second image size conversion step of converting the size of the image supplied from the reproduced image memory, which image is located in the position indicated by the first motion vector; and
- a motion vector size conversion step of converting the size of the first motion vector according to a screen size conversion rate, thereby to generate a second motion vector, and
- the second motion vector that is generated in the motion vector size conversion step is coded, as well as motion compensation inter-frame prediction is performed using a coding target image that is generated in the first image size conversion step and an image that is generated in the second image size conversion step, thereby outputting coded data.

13. An image coding method for outputting plural codes for one coding target image, utilizing motion compensation inter-frame prediction, including:
- a coding target image storage step of storing the coding target image;
- a motion vector detection step of dividing the coding target image into predetermined blocks and extracting a block in a search image, having a highest correlation with each of the predetermined blocks, thereby detecting a first motion vector for each of the predetermined blocks;
- a coding step of coding the first motion vector as well as performing motion compensation inter-frame prediction using an image in a position indicated by the first motion vector in the search image and the coding target image, in accordance with plural coding parameters supplied from outside for the one coding target image, thereby successively generating coded data corresponding to each of the plural coding parameters;
- an image reproduction step of reconstructing an image using one coded data that is generated in the coding step; and
- a search image storage step of storing the image reconstructed in the image reproduction step as a search image that is used in the motion vector detection step.

* * * * *